May 9, 1961 B. B. VAN IPEREN 2,983,840
MAGNETIC BEAM-FORMING DEVICE
Filed May 21, 1953
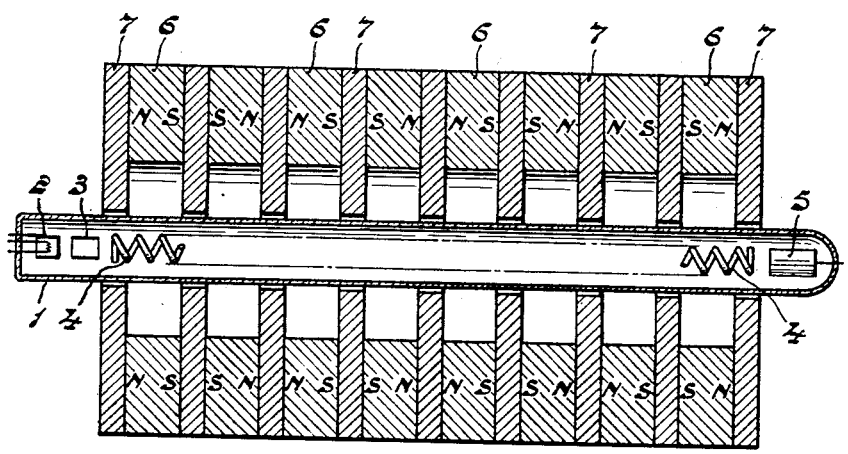
INVENTOR
BERNARDUS BASTIAAN VAN IPEREN
BY
AGENT

United States Patent Office 2,983,840
Patented May 9, 1961

---

2,983,840

MAGNETIC BEAM-FORMING DEVICE

Bernardus Bastiaan van Iperen, Eindhoven, Netherlands, assignor, by mesne assignments, to North American Philips Company, Inc., New York, N.Y., a corporation of Delaware Filed May 21, 1953, Ser. No. 356,437

Claims priority, application Netherlands July 1, 1952

10 Claims. (Cl. 315—3.5)

This invention relates to a magnetic beam-forming device, more particularly, to a permanent magnet beam-forming device for producing a field symmetrical about an axis.

An object of the present invention is to provide a permanent magnet beam-forming device which produces a relatively strong magnetic field.

A further object of the invention is to provide a permanent magnet beam-forming device which is extremely compact.

Still a further object of the invention is to provide a permanent magnet beam-forming device for shaping an electron beam in which the magnetic field produced by the device continuously affects the electron beam over relatively long distances.

These and further objects of the invention will best be understood from the following description.

According to the invention, a magnetic beam-forming device for producing a field having rotational symmetry comprises a composite body consisting of a plurality of stacked, alternatively-arranged, flat, ring-shaped permanent magnets and soft ferromagnetic core members. Each of the permanent magnets are magnetized in their thickness direction, i.e., in the axial direction of the device, and in the opposite sense relative to the adjacent magnet, i.e., like poles face each other. The internal diameter of the magnet rings is greater than the internal diameter of the adjacently-abutting soft ferromagnetic members.

The magnetic field along the axis of the device of the invention has the opposite sense or direction on opposite sides of the soft ferromagnetic rings, the field being zero at the center of the soft ferromagnetic rings; however, since this zero field area is comparatively short, defocussing of an electron beam passing along the axis of the device will not occur. There thus results a periodic magnetic field, along the axis of the device, that approaches a sinusoidal distribution, the period of which equals the spacing between every third soft ferromagnetic ring, and the amplitude of which depends upon the magnetic characteristics of the resultant magnetic circuit.

This arrangement of the permanent magnetic rings tends to cause strong demagnetization; consequently, the permanent magnets are preferably composed of a material in which the remanent induction $B_r$, measured in gausses, is less than about four times the coercive field strength $_BH_c$, measured in oersteds, as such a material will retain its permanent magnetic properties in spite of a high demagnetizing field. Materials fulfilling this condition are, for example, the permanent magnet materials fully described in U.S. Patent No. 2,762,777, which materials are characterized by a composition substantially consisting of non-cubic crystals consisting principally of a composite oxide of iron and of at least one of the metals barium, strontium and lead, and, alternatively, of a small amount of calcium as a partial substituent. The high coercive field strength of these materials allows the magnet rings to be magnetized before joining them together with the soft ferromagnetic rings.

The advantages of the foregoing arrangement is that the device is extremely compact since there are no air-gaps separating the various members of the composite body. Moreover, due to the absence of gaps, a continuous, uninterrupted magnetic field is produced so that the electron beam to be shaped or focussed continuously under its action. A further advantage is that a relatively strong magnetic field can be produced along the axis of the device, which field also has excellent symmetry.

The invention will now be described with reference to the accompanying drawing in which the sole figure is a cross-sectional view of one embodiment of a magnetic beam-forming device according to the invention surrounding a travelling-wave tube.

Referring to the drawing, a travelling-wave tube comprises a cathode 2, an accelerating anode 3, a helical electrode 4 and a collecting anode 5. The tube is surrounded by a beam-forming device according to the invention for shaping the electron beam flowing through the helix, which comprises a plurality of rings 6 of permanent magnetic material and rings 7 of soft iron, which rings are clamped together to form a composite body. The outer diameter of the rings is 75 mms. and the inner diameter of the permanent magnetic and the soft iron rings is 35 mms. and 15 mms., respectively, the thickness of the rings being 11 mms. and 5 mms., respectively. If the permanent magnetic material is chosen from one of the materials described in the aforesaid U.S. patent, the magnetic field strength, measured along the axis of the device, varies exactly sinusoidally with a maximum value of 700 gausses. Different proportions of the permanent magnetic and soft iron rings will produce differently shaped fields which, however, will all be generally sinusoidal as a first approximation. In general, the inside diameter of the soft rings 7, which is less than that of the magnets 6, may be less than four times its thickness in an axial direction. In the specific embodiment illustrated in the drawing, employing eight magnet rings and nine soft rings, it will be apparent that, as the field is essentially zero at each soft member 7 and also changes direction on opposite sides thereof, a total of four full periods of the sinusoidal field distribution will exist along the axis of the traveling-wave tube.

While we have described our invention in connection with specific embodiments and applications, other modifications thereof will be readily apparent to those skilled in this art without departing from the spirit and scope of the invention as defined in the appended claims.

What is claimed is:

1. An electron device comprising electron-beam-producing means for directing a beam of electrons along a given path, in combination with a magnetic device surrounding the electron path for maintaining said electrons in beam-forming relationship; said magnetic device comprising a hollow structure constituted of a plurality of axially-aligned, substantially planar, annular, permanent magnets magnetized axially but with like poles of adjacent magnets confronting one another, and a plurality of soft ferromagnetic, annular members interposed between and abutting adjacent magnets and spaced substantially equal distances apart; said hollow structure forming along the electron path through its interior a periodic magnetic field capable of focussing the beam.

2. A device as set forth in claim 1, in which the magnets all have the same size, and the soft members all have the same size, thereby to form a periodic magnetic field along the electron path of a length extending over a plurality of periods.

3. An electrical device comprising charged-particle-beam-producing means for directing a beam of charged particles along a given path in combination with a magnetic device surrounding the charged particle path for maintaining said charged particles in beam-forming relationship; said magnetic device comprising a hollow structure constituted of a plurality of similar, axially-aligned, substantially planar, annular, permanent magnets magnetized axially but with like poles of adjacent magnets confronting one another, and a plurality of soft ferromagnetic, annular members interposed between and abutting adjacent magnets, said magnets having the same thickness in an axial direction, said soft members having the same thickness in an axial direction, the inside diameter of said soft members being smaller than that of said magnets; said hollow structure forming along the charged particle path through its interior an axially-symmetrical, periodic, magnetic field possessing a sinusoidal distribution and of a length extending over a plurality of periods.

4. A device as set forth in claim 3, wherein the permanent magnets are constituted of a material consisting principally of a composite oxide of iron and of at least one of the metals selected from the group consisting of barium, strontium and lead.

5. An electron device comprising electron-beam-producing means for directing a beam of electrons along a given, linear, extended path, in combination with a magnetic device surrounding the electron path for maintaining said electrons in beam-forming relationship; said magnetic device comprising a hollow structure constituted of a plurality of axially-aligned, sandwiched, ring-shaped members, alternate ones of said ring-shaped members being substantially identical permanent magnets magnetized axially but with like poles of adjacent magnets confronting one another, the remaining ring-shaped members being substantially identical, soft ferromagnetic members interposed between and abutting adjacent magnets and spaced equal distances apart, said soft members having a smaller inside diameter than the permanent magnets, the axis of said hollow structure coinciding with the extended beam path, sufficient ring-shaped members being provided to establish along substantially the entire, extended, beam path a substantially exactly sinusoidal, periodic, axially-symmetrical, strong, magnetic field containing a plurality of periods.

6. A device as set forth in claim 5 wherein said soft members have an inside diameter of a value less than the value of the thickness, in an axial direction, of one of said soft members multiplied by four.

7. An electron device according to claim 1 wherein each of said permanent magnets comprises a flat ring-shaped member, and wherein said plurality of axially-aligned magnets defines a substantially straight axis of said magnetic device and said beam directing means directs said beam substantially along said axis.

8. A traveling wave tube comprising an evacuated envelope, means for forming a beam of electrons for flow axially through said envelope, an interaction circuit for propagating a slow electromagnetic wave in field coupling relation with said beam and means for focussing the electron beam during its progression past said interaction circuit, said focussing means comprising a succession of identical pole pieces spaced equal distances apart along the path of said flow, and a plurality of substantially identical magnet means interposed between adjacent pole pieces, each of said pole pieces being common to like poles of two adjacent magnetic means and each adjacent pair of said pole pieces defining a gap of the same length as the other of said gaps, whereby said pole pieces and magnet means provide a longitudinal region of periodic spatially alternating magnetic field along the axis of said electron beam.

9. A traveling wave tube in accordance with claim 8 wherein said pole pieces are cylindrical shaped members of magnetic materials positioned external to said envelope, and adjacent thereto.

10. In a traveling wave tube, an evacuated envelope, means for forming an electron beam for flow axially through said envelope, an interaction circuit extending within said envelope parallel to the electron beam for propagating a slow electromagnetic wave in coupling relation with the electron beam, and means for focussing the electron flow in its passage past said interaction circuit, said means comprising a plurality of identical tubular cylinders of material having a high permeability spaced uniformly apart and coaxially with the path of electron flow, and a plurality of identical permanent magnets, each extending between two successive cylinders, said cylinders constituting pole pieces and each pole piece serving as a common bridging point for like poles of adjacent magnets, successive magnets thereby being reversed in sense, and alternate cylinders being of the same magnetic polarity, the succession of cylinders serving as a succession of oppositely poled pole pieces forming a longitudinal region of periodic spatially alternating magnetic field sinusoidal in effect along the axis of the beam.

References Cited in the file of this patent

UNITED STATES PATENTS

| | | |
|---|---|---|
| 2,200,039 | Nicoll | May 7, 1940 |
| 2,269,149 | Edgar | Jan. 6, 1942 |
| 2,296,355 | Levin | Sept. 22, 1942 |
| 2,300,052 | Lindenblad | Oct. 27, 1942 |
| 2,305,884 | Litton | Dec. 22, 1942 |
| 2,640,162 | Espenschied et al. | May 26, 1953 |
| 2,659,065 | Cordell | Nov. 10, 1953 |
| 2,741,718 | Wang | Apr. 10, 1956 |

UNITED STATES PATENT OFFICE
CERTIFICATE OF CORRECTION

Patent No. 2,983,840                                  May 9, 1961

Bernardus Bastiaan van Iperen

It is hereby certified that error appears in the above numbered patent requiring correction and that the said Letters Patent should read as corrected below.

Column 2, line 8, after "focussed" insert -- is --; line 46, for "we" read -- I --; same line 46, for "our" read -- my --; column 4, line 4, for "wave-in" read -- wave in --; line 5, after "beam" insert a comma; same column 4, line 20, for "materials" read -- material --.

Signed and sealed this 10th day of October 1961.

(SEAL)
Attest:

ERNEST W. SWIDER                                  DAVID L. LADD
Attesting Officer                                     Commissioner of Patents
                                                                                            USCOMM-DC